COESTER & DEWEY.
Pot Lifter.

No. 61,654.

Patented Jan. 29, 1867.

Witnesses:
Theo Fusch
J. A. Service

Inventors:
C. Coester
H. L. Dewey
Per Munn & Co
Attorneys

United States Patent Office.

CHARLES COESTER, JR., AND W. L. DEWEY, OF BRIDGEPORT, CONNECTICUT.

Letters Patent No. 61,654, dated January 29, 1867.

TIPPING ATTACHMENT FOR POTS AND KETTLES.

*The Schedule referred to in these Letters Patent and making part of the same.*

TO ALL WHOM IT MAY CONCERN:

Be it known that we, CHARLES COESTER, Jr., and W. L. DEWEY, of Bridgeport, in the county of Fairfield, and State of Connecticut, have invented a new and improved Tipping Attachment for Pots and Kettles; and we do hereby declare that the following is a full, clear, and exact description thereof, which will enable those skilled in the art to make and use the same, reference being had to the accompanying drawings, forming part of this specification, in which—

Figure 1:
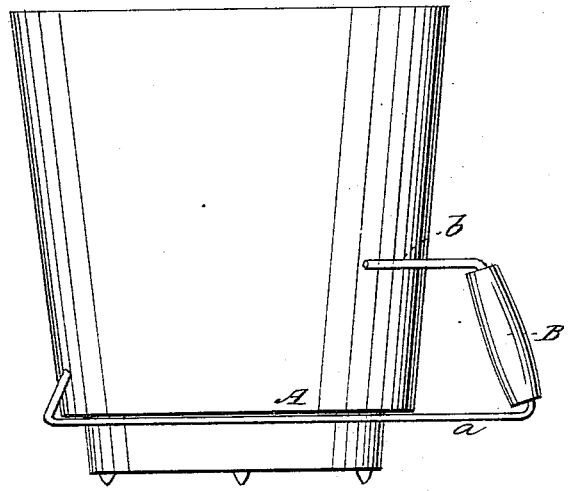

Figure 1 is a side view of my invention, applied to a pot or kettle.

Figure 2:
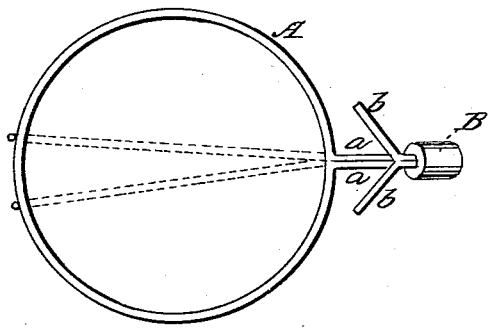

Figure 2, a detached plan or top view of the same.

Similar letters of reference indicate corresponding parts.

This invention relates to a new and simple attachment to be applied to pots and kettles which are not provided with handles, and is designed to assist in tipping the same. The tipping of pots and kettles which are not provided with handles is attended with considerable trouble, especially when just taken off from a fire with the contents hot; and my invention fully obviates this difficulty.

This invention consists of a metal ring or clasp so constructed that it may be fitted to the lower part of the pot or kettle, the ring or clasp being provided with a handle and a bearing, all arranged as hereinafter fully shown and described, whereby the device may be readily applied to and detached from the pot or kettle.

A represents a ring or band constructed of an iron rod or stout wire bent in circular form, and having two parallel straight parts $a\ a$ in contact, the lower portions of which project radially from the ring or band, and the upper portions slightly inclined from a vertical position to receive a handle, B, which may be of wood. The upper portions of $a\ a$, above the handle B, are bent outward from each other, as shown in fig. 2 at $b\ b$. The device is applied by slipping the ring or band A on the lower part of the pot or kettle, the upper ends $b\ b$ of $a\ a$, above the handle B, bearing against the side of the pot or kettle, as shown clearly in fig. 1. The implement or device thus applied forms a convenient handle, by which the pot or kettle may be readily tipped. Instead of the ring or band A to encompass the pot or kettle, a forked rod may be used, shown in red, one end being bent upward to form claws or hooks to grasp the pot or kettle at one side, while the upper ends of $a\ a$, above the handle B, grasp or bear against the pot or kettle at the opposite side. The same effect or result will be obtained in either case.

Having thus described our invention, what we claim as new, and desire to secure by Letters Patent, is—

A tipping attachment for pots and kettles, constructed substantially as herein shown and described.

W. L. DEWEY.
CHAS. COESTER, JR.

Witnesses:
JULIN H. BENHORS,
JAMES STAPLES.